(12) United States Patent
Adams

(10) Patent No.: US 9,403,613 B2
(45) Date of Patent: Aug. 2, 2016

(54) BEVERAGE CONTAINER

(71) Applicant: Junis Adams, Oakland, CA (US)

(72) Inventor: Junis Adams, Oakland, CA (US)

( * ) Notice: Subject to any disclaimer, the term of this patent is extended or adjusted under 35 U.S.C. 154(b) by 0 days.

(21) Appl. No.: 14/583,327

(22) Filed: Dec. 26, 2014

(65) Prior Publication Data

US 2015/0183628 A1  Jul. 2, 2015

Related U.S. Application Data

(60) Provisional application No. 61/920,845, filed on Dec. 26, 2013.

(51) Int. Cl.
| | | |
|---|---|---|
| *B67D 1/00* | (2006.01) | |
| *B65D 1/00* | (2006.01) | |
| *A45F 3/46* | (2006.01) | |
| *B65D 81/32* | (2006.01) | |
| *B67D 3/00* | (2006.01) | |
| *A47G 19/22* | (2006.01) | |
| *B65D 83/00* | (2006.01) | |
| *A47J 45/06* | (2006.01) | |

(52) U.S. Cl.
CPC ... *B65D 1/00* (2013.01); *A45F 3/46* (2013.01); *B65D 81/3216* (2013.01); *A47G 19/2205* (2013.01); *A47J 45/06* (2013.01); *B65D 83/00* (2013.01); *B67D 3/0029* (2013.01)

(58) Field of Classification Search
CPC ...... B67D 3/0029; B65D 25/40; B65D 83/00; A47G 19/2205; A47G 19/00; A47G 45/06
USPC ........ 222/94, 105–106, 80–83.5, 88–91, 466, 222/192, 325, 530, 533–535, 538
See application file for complete search history.

(56) References Cited

U.S. PATENT DOCUMENTS

| | | | | | |
|---|---|---|---|---|---|
| 2,065,983 | A | * | 12/1936 | Reid ........................ | A47F 1/03 141/104 |
| 3,315,846 | A | * | 4/1967 | Landis et al. ............. | F25D 3/08 165/135 |
| 4,095,672 | A | * | 6/1978 | Senese .................. | F01M 11/045 116/137 R |
| 4,911,562 | A | * | 3/1990 | Mazzeschi ............. | B65D 37/00 224/148.1 |
| 4,921,135 | A | * | 5/1990 | Pleet ........................ | B67B 7/26 222/105 |
| 5,056,691 | A | * | 10/1991 | Tolbert ................. | B65D 25/385 222/466 |
| 6,269,980 | B1 | * | 8/2001 | Randall ................ | B67D 1/0456 222/145.5 |
| 6,971,545 | B2 | * | 12/2005 | Martinez ................. | G07F 13/10 221/199 |
| 7,415,794 | B1 | * | 8/2008 | Thompson ............. | A01K 97/22 206/315.11 |
| 8,485,396 | B1 | * | 7/2013 | Petrossian ................ | B67D 7/02 222/132 |
| 2003/0178444 | A1 | * | 9/2003 | Brusowankin ....... | B67D 3/0019 222/192 |
| 2007/0114245 | A1 | * | 5/2007 | Trent, Jr. ................ | B65D 25/20 222/158 |
| 2007/0246488 | A1 | * | 10/2007 | Cash ...................... | B65D 23/10 222/466 |
| 2010/0018988 | A1 | * | 1/2010 | Reineccius ............. | A47F 1/085 221/96 |
| 2012/0325866 | A1 | * | 12/2012 | Lee ........................ | B65D 25/42 222/466 |
| 2015/0183628 | A1 | * | 7/2015 | Adams ................. | B67D 3/0029 222/192 |

* cited by examiner

*Primary Examiner* — Paul R Durand
*Assistant Examiner* — Andrew P Bainbridge
(74) *Attorney, Agent, or Firm* — Howard Cohen

(57) ABSTRACT

A beverage container that resembles the well-known gasoline can shape includes a spout, an integrally formed top handle, and a rear handle assembly that includes an interior handle space dimensioned to store 3-6 shot glasses in a vertically nested stack. An access door in a side wall enables use of replaceable sealed cartridge that contains the liquid being transported and served, the spout including a punch to tap the cartridge. A condiments tray is slidably disposed in a drawer space below the cartridge for separately storing mixological condiments, and includes a push button activated latch that keeps the tray closed and secure in the drawer space.

18 Claims, 5 Drawing Sheets

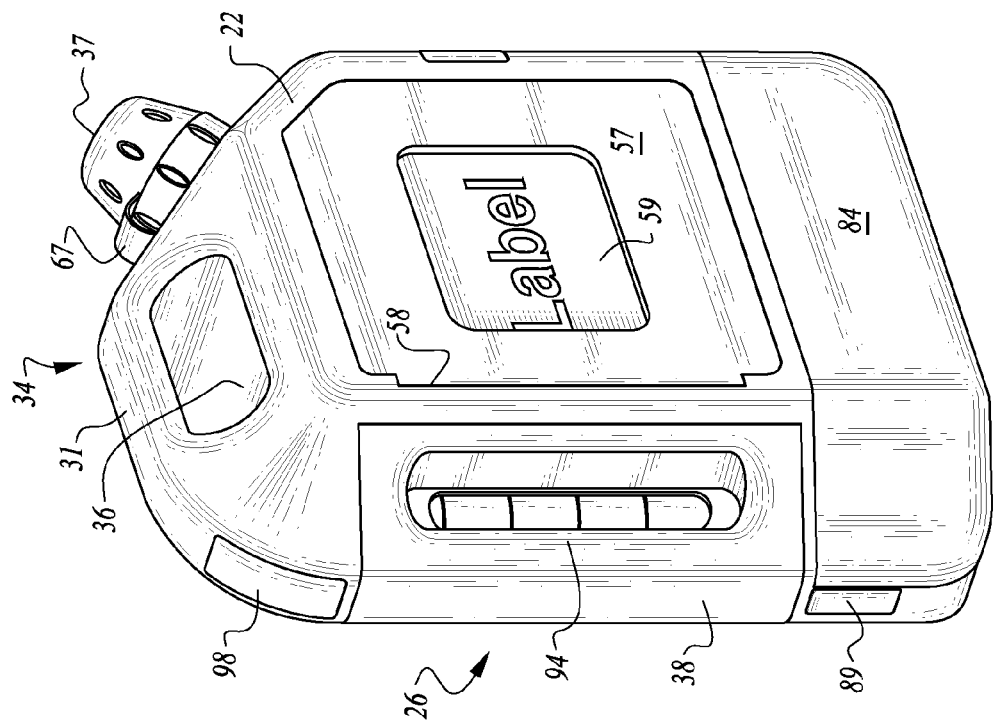
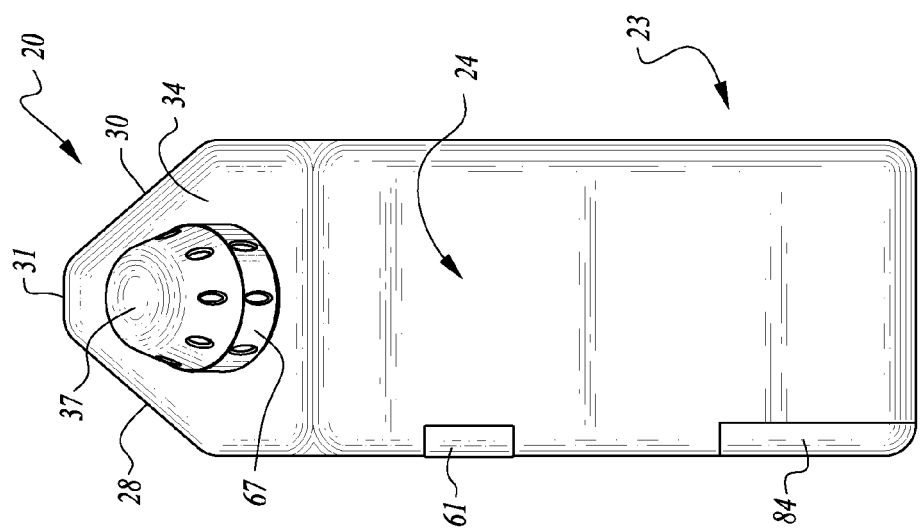

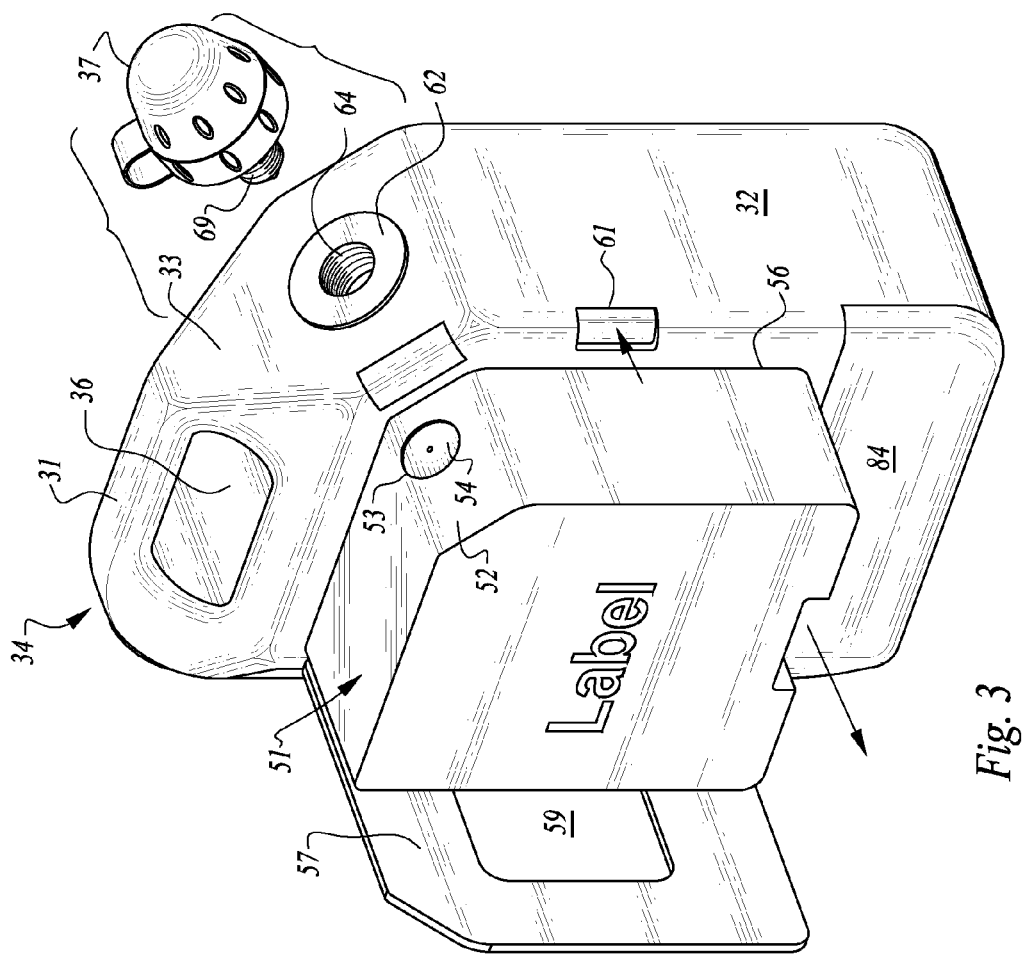
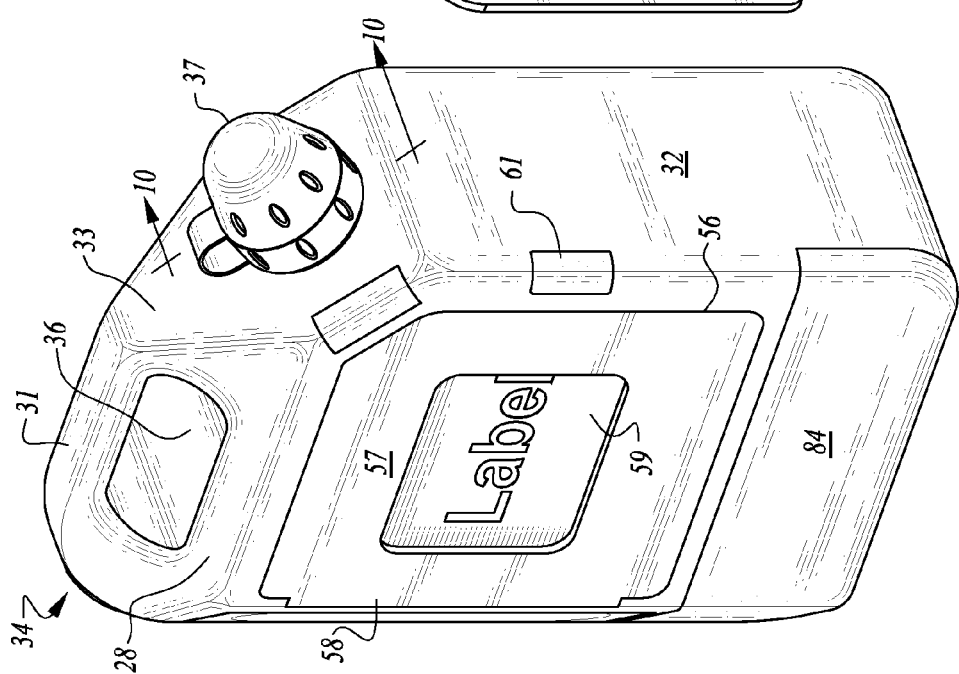
Fig. 3
Fig. 2

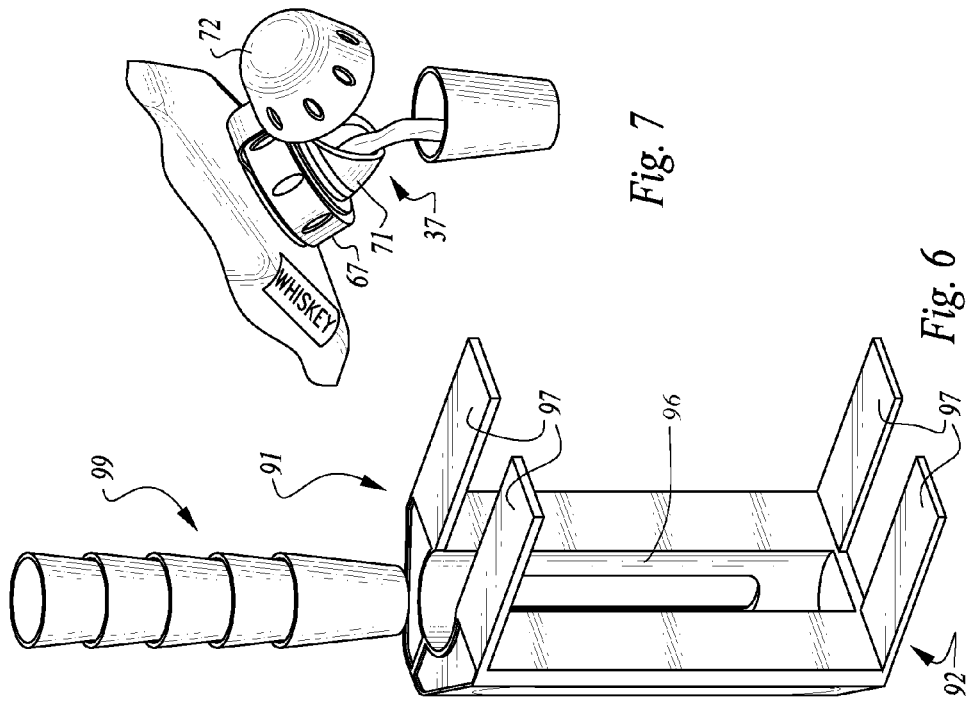
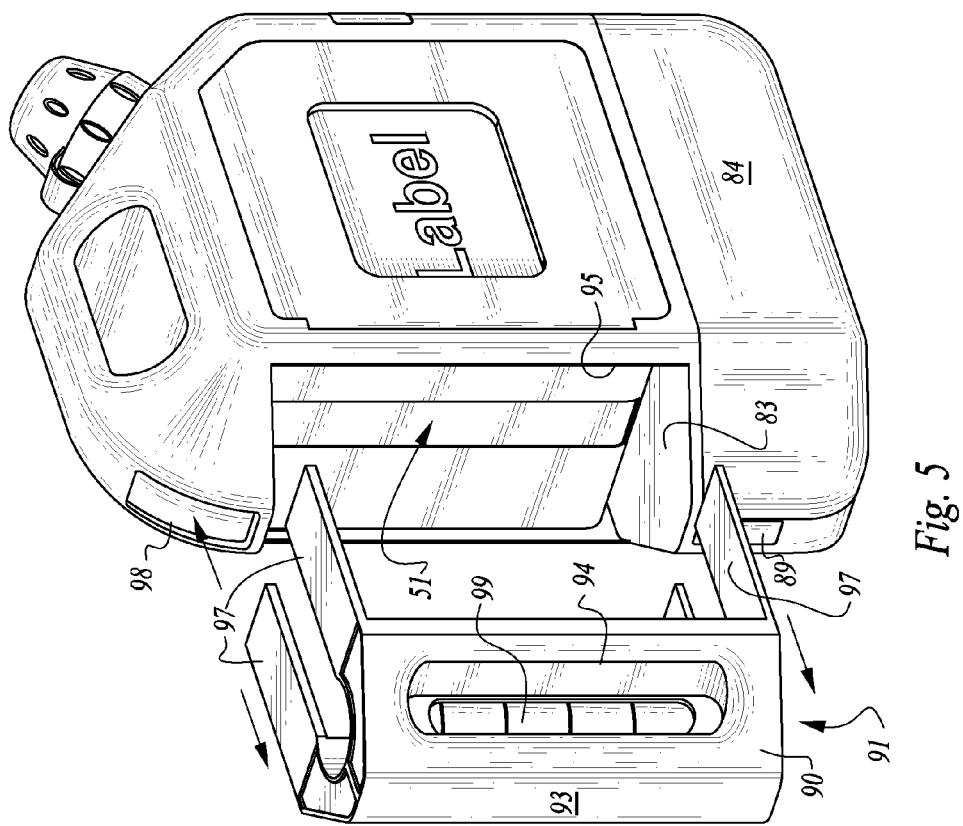

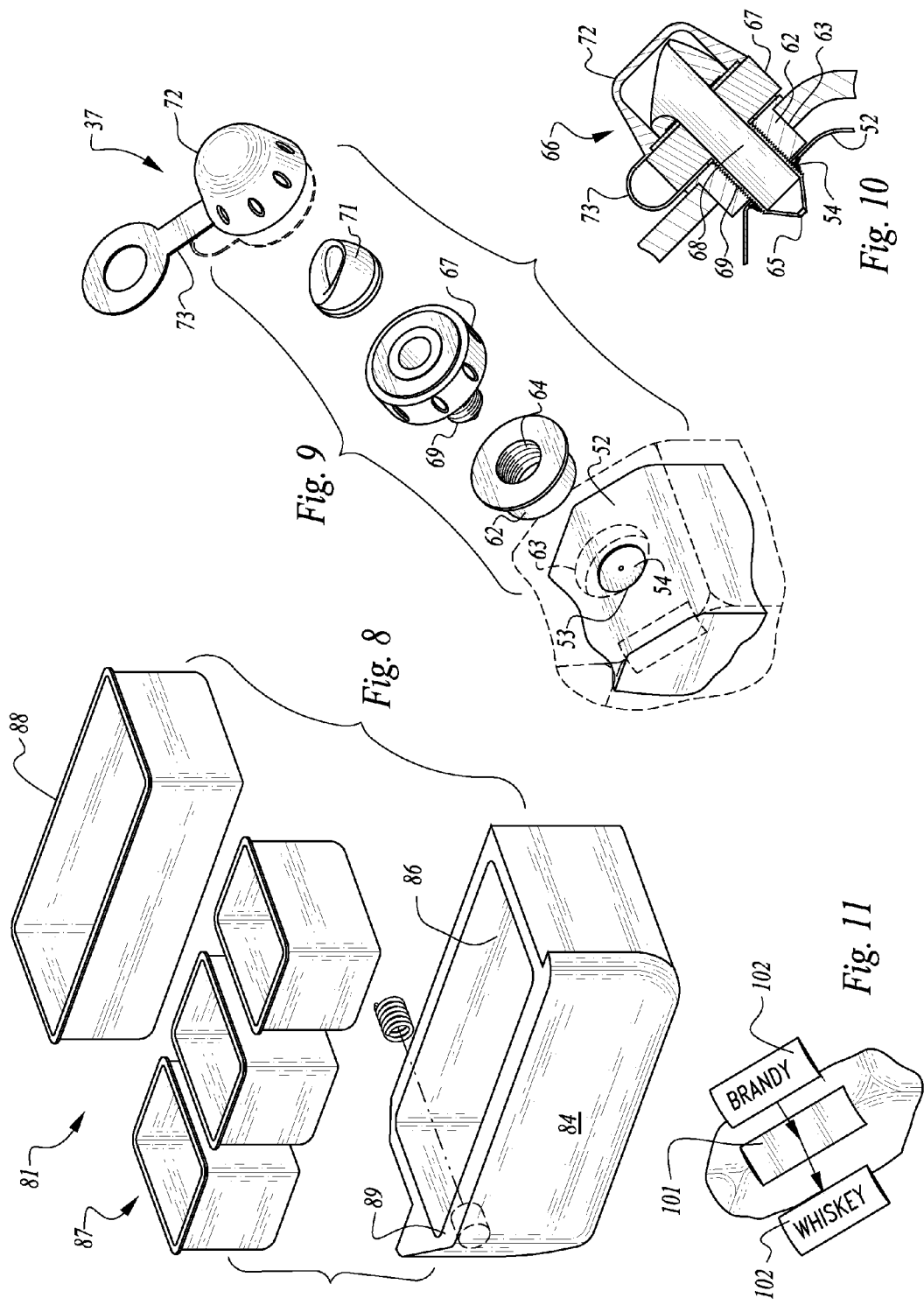

BEVERAGE CONTAINER

CROSS-REFERENCE TO RELATED APPLICATIONS

This application claims the benefit of the filing date priority of Provisional Application No. 61/920,845, filed Dec. 26, 2013

FEDERALLY SPONSORED RESEARCH

Not applicable.

SEQUENCE LISTING, ETC ON CD

Not applicable.

BACKGROUND OF THE INVENTION

1. Field of the Invention

This invention relates to beverage containers and, more particularly, to alcoholic beverage containers that transport the beverage as well as the accoutrements used to serve the beverage.

2. Description of Related Art

At many casual parties and gatherings, it is customary for the guests or attendees to bring with them a beverage that they will be consuming at the event. Depending on the tastes of the individual and the nature of the event, the beverage may be alcoholic and consist of a selection from the list of beer, wine, sparkling wine, and distilled spirits. This custom of BYO (Bring Your Own) enables many people to convene social gatherings of friends and families without undertaking the expense of purchasing alcoholic beverages, which are otherwise often the most expensive cost item of a party.

If the party attendee wishes to bring an alcoholic beverage of distilled spirits, it is often necessary or expected to serve the beverage with traditional condiments. For example, tequila is usually accompanied by lime sections, salt, or bitters, and rum may be accented with citrus fruit, sweet fruit or sugar, and the like. It is simple enough to transport a bottle of spirits, but the addition of condiments requires extra containers (often leakproof), bags, and general hand baggage. This is not convenient for the party-goer.

BRIEF SUMMARY OF THE INVENTION

The present invention generally comprises a beverage container that is designed to enable an individual to transport a beverage in a safe and sealed and stylish container. In addition, the invention provides a separate compartment and tray or drawer for storing and carrying condiment items such as citrus sections, maraschino cherries or olives, sugar cubes, chopped herbs, and the like.

A salient aspect of the invention is the shape of the outer housing, which mimics the well-known gasoline can shape in a manner that is familiar to all vehicle drivers. The housing has the general form of a rectangular prism, and it designed with a base adapted to rest on a horizontal surface with the container extending upwardly therefrom. Opposed side walls are joined by opposed end walls and top and bottom walls in a rectangular layout, and the upper ends of the end walls taper and converge toward each other. A spout extends from one of the tapered surfaces for pouring the liquid stored in the container, and includes a cap to seal the spout opening A top handle is integrally formed in the top wall of the container. A rear handle assembly protrudes from one of the end walls and includes an interior handle space dimensioned to store 3-6 shot glasses in a vertically nested stack.

Another significant feature of the invention is an access door hinged to one of the side walls of the container to enable access to the interior cavity of the container. The interior cavity houses a sealed cartridge that contains the liquid being transported and dispensed. The cartridge is also a rectanguloid prism that fits in complementary fashion within the cavity, and is intended to be disposable while the remainder of the assembly is reusable. The provision of cartridges filled with liquid enables a manufacturer to sell various types of liquor, each in a respective cartridge, so that the consumer may choose the beverage being transported by buying the respective filled cartridge and installing it in the reusable container.

Another important aspect of the container is the provision of a condiments tray slidably disposed in a drawer space below the interior cavity. The condiments tray has several compartments for separately storing mixological condiments, and includes a push button activated latch that keeps the tray closed and secure in the drawer space until the user wishes to access the condiments.

BRIEF DESCRIPTION OF THE DRAWING

FIG. 1A is a front elevation of the beverage container of the present invention.

FIG. 1B is a rear quarter perspective elevation of the beverage container of the present invention.

FIG. 2 is a front quarter perspective elevation of the beverage container of FIGS. 1A and 1B.

FIG. 3 is an exploded assembly view from a front quarter perspective showing the beverage cartridge and the container, as well as the removable spout assembly.

FIG. 5 is an exploded assembly view from a rear quarter perspective showing in particular the beverage container and the shot glass holder handle assembly.

FIG. 6 is an exploded assembly view of the shot glass holder handle shown in FIG. 5.

FIG. 7 is an enlarged perspective view of the spout assembly in use filling a glass with a beverage from the cartridge in the container.

FIG. 8 is an exploded assembly view of the condiments drawer of the beverage container.

FIG. 9 is an exploded assembly view of the spout assembly of the beverage container of the invention.

FIG. 10 is an enlarged cross-sectional elevation showing the spout assembly depicted in FIG. 9.

FIG. 11 is a magnified view of the replaceable label feature of the container of the invention.

DETAILED DESCRIPTION OF THE INVENTION

Figure 4:
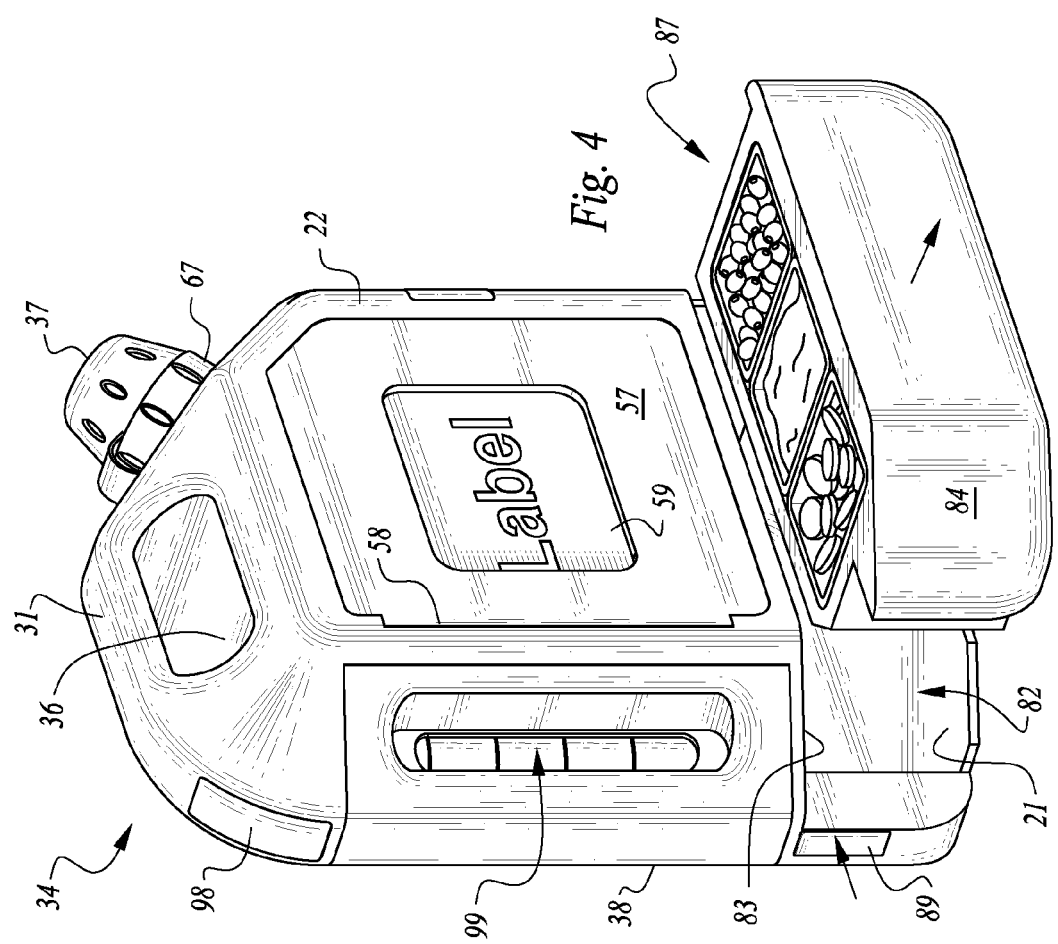
FIG. 4 is a rear quarter perspective elevation of the beverage container, shown with the condiments tray in the open disposition.

The present invention generally comprises a beverage container that is designed to enable an individual to transport a beverage in a safe and sealed and stylish container. A significant aspect of the container is that it is an assembly configured to mimic the well-known shape of a fuel (gasoline) can, in a manner that is familiar to all vehicle operators. The combination of the familiar shape that is juxtaposed with an unfamiliar use provides a visual dissonance that attracts the eye and the interest of the observer.

With regard to the accompanying figures, and in particular FIGS. 1-4, the beverage container 20 is an assembly that includes a base 21 that rests on a horizontal support, and opposed side walls 22 and 23 and opposed ends 24 and 26 extending upwardly from the base 21 and joined to form a generally rectangular prism configuration. At the upper end of the container 20 the sidewalls include upper oblique portions 28 and 30 that converge as they extend upwardly in tapering fashion to a flattened crown strip 31. The end 24 is termed the front in this description, and includes a front end wall 32 extending vertically, with an upper oblique portion 33 extending upwardly and tapering rearwardly to join the oblique portions 28 and 20 and form an upper handle portion 34. An opening 36 extends laterally through the portions 28 and 30 to enable a user to extend fingers and thumb therethrough and grasp the top of the beverage container 20 with one hand. A pour spout assembly 37 extends upwardly from the oblique portion 33 of the front end wall 32 to enable a user to decant a liquid beverage from the container 20. The back end 26 of the container is comprised of tapering surfaces that converge in a manner similar to the upper handle 34, to form a rear handle assembly 38. Thus, for example, the container 20 may be lifted by a user by engaging the upper handle 34 with one hand and using the other hand to grasp the rear handle assembly 38 to tip the container and pour the libation from the spout 37, as shown in FIG. 7.

The features described in general above are formed by exterior surfaces that join at smoothly radiused intersections to provide a smooth, streamlined appearance with no sharp corners or vertices.

A significant aspect of the invention is the provision of a cartridge 51 to contain the liquid that is carried and dispensed by the container 20. As shown in FIG. 3, the cartridge 51 is a hollow rectangular prism that is configured and dimensioned to be received within the sidewalls and front and rear ends of the container 20. The cartridge 51 includes an upper front end wall 52 that slopes upwardly and rearwardly in complimentary fashion to the outer wall portion 33, and an access port 53 disposed in the upper front end wall 52. A frangible seal 54 occludes the port 53 to enclose the liquid entirely within the cartridge in leakproof fashion.

The cartridge 51 is received within an upper interior space 56 in the container 20. The side 22 is provided with a door 57 hinged along vertical rear edge 58, the door 57 having a plan outline that is complementary to the side elevation of the cartridge 51. The hinge enables the door 57 to be rotated open as shown in FIG. 3 so that the cartridge 51 may be slidably inserted into the space 56 or removed therefrom and replaced. The door 57 is held closed by an internal latch having a latch release button 61 adjacent to a front edge of the door 57. The door may optionally be provided with a transparent window 59 to enable a user to visualize the cartridge 51 within the space 56 and to read the label on the cartridge and be apprised of the contents of the cartridge.

The invention includes a plurality of cartridges 51 that may be sold to the user, each cartridge being filled with a particular type of beverage. Thus a variety of beverages may be sold in labeled cartridges which are selectively installed and used within the reusable container 20. A significant aspect of the invention is the production and vending of the cartridges 51 in conjunction with the use of the container 20. The cartridges may be produced to hold standard beverage-vending amounts, such as one liter, 750 ml, 500 ml, 3.78 L (one gallon), one quart, and the like. The cartridges may be disposable after use, or reusable, or recyclable, or may be repurposed for other uses subsequent to use in the container 20.

With regard to FIGS. 3, 9, and 10, the spout assembly 37 includes an annular bushing 62 that is received in a complementarily-formed hole 63 in the wall portion 33 of the container 20. The bushing is formed of resilient elastomer and is press-fit in hole 63 to form a leak-proof seal therewith. A spout assembly 66 includes a cylindrical portion 67 and a tubular core 68 extending coaxially therethrough. The inner end of the core 68 is formed as a sharpened conical lance 65, and the exterior is provided with threads 69 to engage complementarily threaded bore 64 in the bushing 62. The outer end of core 68 is joined to a funnel-like spout 71 for directing liquid poured therefrom into a compact stream. A cap 72 is joined to the spout assembly 37 by a strap 73 that is secured about the core 68.

When a cartridge 51 is installed in the interior space 56 of the container 20, the upper oblique wall 52 abuts the inner end of the bushing 62, with the opening 53 axially aligned with the bushing 62. The spout assembly 66 may be installed with the end 69 of the core 68 threaded into bore 64, causing the end 65 to pierce the seal 54, as shown in FIG. 10. The spout installation thus enables the user to open the sealed cartridge 51 and gain access to the contents, which may then be poured from the spout 37 when desired.

A further feature of the container 20 is the provision of a condiments tray assembly 81, as shown in FIGS. 4 and 8. The container includes a lower interior space 82 directly below upper interior space 56 and separated therefrom by an interior wall or strut 83, as shown in FIG. 5. The interior space 82 is open along sidewall 22, and a tray 84 is dimensioned to be slidably received in interior space 82. The exterior surfaces of tray 84 are configured to extend flush to the sidewall 22 and front and rear ends when the tray is fully installed in space 82, as shown in FIGS. 1A, 1B, 2, 3, and 5. The tray includes an upwardly opening coffer 86 which may house interchangeable containers such as the trio of small bins 87 or a single large bin 88, as shown in FIG. 8. When the tray is loaded with condiments, as shown in FIG. 4 (with the trio of bins 87), it may be slidably installed in the space 82, and the condiments are thus transportable in safe, enclosed fashion in the same container as the beverage for which they are intended. A pushbutton latch 89 is mounted at the lower back end of the container to secure the tray 84 in the closed position and release the tray when desired to gain access to the condiments. Note that the tray 84 is entirely removable for easy loading and cleaning.

With particular regard to FIGS. 1B, 4, 5 and 6, a further feature of the container 20 is a shot glass holder 91 built into the rear handle assembly 38 described above. A rear bracket component 92 is comprised of opposed vertical surfaces 90 extending from a flush conjunction with sidewalls 22 and 23 and tapering rearwardly to a rounded vertically extending crown strip 93 that is contiguous with upper crown strip 31. Recesses 94 are formed in the vertical surfaces 90 to comprise a hand grip. A semi-cylindrical tubular housing 96 is disposed vertically and medially of the opposed vertical surfaces 90, and is closed at the lower end but open at the upper end. Pairs of upper and lower support arms 97 extend from the component 92 and are spaced apart vertically to span the vertical extend of the cartridge 51 within the interior space 56 of the container. The pairs of arms 97 are dimensioned to be slidably received through rear opening 95 within the interior space 56 as shown in FIG. 5, with the exterior surfaces 90 flush with sidewalls 22 and 23. Note that the cartridge 51 cannot be removed nor replaced through opening 95. A pushbutton latch 98 is disposed within a rear portion of upper handle 34 to secure the shot glass component 92 within the container and release it when desired by the user. The tubular housing 96 is formed of transparent plastic material and is dimensioned to store and display a nested stack of shot glasses 99, from 3-6 depending on their size and configuration.

With regard to FIG. 11 in particular, the container 20 may be provided with a label holder 101 that is displayed prominently, such as shown at the conjunction of sidewall 22 and upper oblique wall portion 33 (FIGS. 2 and 3). The label 102 may be vended with the cartridge 51 and secured in holder 101 by self-adhesive, press fit, or the like. The label 102 is changed in accordance with the removal and replacement of cartridge 51 with a different liquid spirits.

It may be appreciated that the container 20 described above provides a stylish and attractive decanter having the top handle, rear handle, pour spout, and planar vertical sides that are typical of an emergency fuel container, commonly known as a gas can. These elements are familiar to the general public, but the use of a drink container and dispenser having a gasoline can appearance creates a visual dissonance that is eye-catching and attractive. Furthermore, the container provides storage not only for the spirits contained in cartridge 51, but also the condiments in condiment tray 84 for serving the spirits, and glasses 99 for sharing the spirits and condiments, all in one convenient container. Thus the container is ideal for individuals attending parties, gatherings and social events where it is expected to "bring your own" spirits and libations.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. A container assembly for transporting and serving a liquid beverage that appears to be a standard petroleum fuel container, including:
    a housing assembly including a base panel and opposed sidewalls extending upwardly therefrom, and opposed front and rear end assemblies spanning vertical edges of said sidewalls to form a generally rectangular enclosure;
    a top handle assembly joined to upper extents of said sidewalls and front and rear end assemblies;
    a rear handle assembly joined to rear vertical edges of said sidewalls, wherein said rear handle assembly is removably secured to said housing assembly;
    wherein said rear handle assembly includes a semi-cylindrical tubular component disposed therein and dimensioned to receive and secure a nested stack of beverage serving glasses; a spout assembly joined to an upper portion of said front assembly.

2. The container assembly of claim 1, wherein said housing assembly includes an upper interior space, and further including a sealed cartridge containing a beverage liquid, said cartridge having an outer configuration that is complementary to the interior configuration of said upper interior space.

3. The container assembly of claim 2, wherein said cartridge further includes an access port disposed in proximity to an interior end of said spout assembly.

4. The container assembly of claim 3, wherein said access port includes a frangible seal, and said interior end of said spout assembly includes a projecting end for piercing said frangible seal to establish a flow path from said sealed cartridge through said access port to said spout assembly.

5. The container assembly of claim 2, further including an opening in one of said sidewalls configured to receive a cartridge therethrough, and a door hingably secured to said opening.

6. The container assembly of claim 5, further including a door latch for securing said door and a cartridge within said upper interior space.

7. The container assembly of claim 5, further including a plurality of said cartridges, each filled with a selected type of liquid beverage, said cartridges capable of being separately vended and replaceably received within said upper interior space of said container.

8. The container assembly of claim 1, wherein said housing assembly includes a lower interior space, and further including an opening in one of said sidewalls extending to said lower interior space.

9. The container assembly of claim 8, further including a condiment tray configured to be received in said opening and slidable between an open and a closed position, said condiment tray having exterior surfaces that extend flush to said opening when said tray is in said closed position.

10. The container assembly of claim 9, further including a plurality of bins received in said condiment tray for containing respective condiments therein.

11. The container assembly of claim 10, further including a tray latch for securing said tray within said lower interior space.

12. The container assembly of claim 1, wherein said housing assembly includes an upper interior space, and further including a sealed cartridge containing a beverage liquid and disposed in said upper interior space.

13. The container assembly of claim 12, wherein said rear handle assembly includes upper and lower arms extending therefrom and slidably received in rear openings in said housing, said upper and lower arms spanning the upper and lower extents of said cartridge.

14. The container assembly of claim 13, further including an opening in one of said sidewalls extending to a lower interior space, and a condiment tray configured to be received in said opening and slidable between an open and a closed position.

15. The container assembly of claim 7, further including a label holder secured to the exterior of said housing and configured to display a label indicating the liquid beverage contents of the cartridge within said upper interior space.

16. The container assembly of claim 1, wherein said spout assembly includes a funnel-like spout extending outwardly therefrom, and a cap removably securable to said spout to seal the opening thereof.

17. The container assembly of claim 1, wherein said top handle assembly includes an opening extending laterally therethough as a handhold.

18. The container assembly of claim 7, further including a window disposed in said door for enabling visualization of the cartridge within said upper interior space.

* * * * *